United States Patent [19]

Blankenship

[11] 4,251,251
[45] Feb. 17, 1981

[54] METHOD OF MAKING OPTICAL DEVICES

[75] Inventor: Michael G. Blankenship, Corning, N.Y.

[73] Assignee: Corning Glass Works, Corning, N.Y.

[21] Appl. No.: 44,192

[22] Filed: May 31, 1979

Related U.S. Application Data

[63] Continuation of Ser. No. 922,559, Jul. 7, 1978, abandoned, which is a continuation-in-part of Ser. No. 808,862, Jun. 22, 1977, abandoned.

[51] Int. Cl.³ .................. C03B 37/00; C03C 25/02
[52] U.S. Cl. .................................. 65/3 A; 65/13; 65/18; 65/110; 427/163
[58] Field of Search ............ 65/3 A, 13, 18, 110; 427/163

[56] References Cited

U.S. PATENT DOCUMENTS

| | | | |
|---|---|---|---|
| 3,249,414 | 5/1966 | Hamilton | 65/110 X |
| 3,859,073 | 1/1975 | Schultz | 65/3 A |
| 3,933,453 | 1/1976 | Burke et al. | 65/18 X |
| 3,961,926 | 6/1976 | Asam | 65/3 A |
| 4,009,014 | 2/1977 | Black et al. | 65/3 A |
| 4,123,483 | 10/1978 | Nakahara et al. | 65/3 A X |

FOREIGN PATENT DOCUMENTS 820812  8/1969  Canada .
1501586 3/1977  United Kingdom .

OTHER PUBLICATIONS

"Laboratory Glass-Working", A. J. B. Robertson et al., pp. 58–59, Acedemic Press Inc., London, 1957.

*Primary Examiner*—Robert L. Lindsay, Jr.
*Attorney, Agent, or Firm*—William J. Simmons, Jr.; Walter S. Zebrowski

[57] ABSTRACT

A method of making solid glass articles by the flame hydrolysis technique. First and second layers of glass soot produced by a flame hydrolysis are deposited on the outside surface of a mandrel to form a porous preform. The refractive index of the soot particles of the first layer is greater than that of the soot of the second layer, and the soot of the first layer has a viscosity lower than that of the second layer. The mandrel is removed, and the soot preform is subjected to a high temperature whereby it is consolidated to form a dense glass blank. The glass surface tension and the relative viscosities of the inner and outer portions of the preform cause the aperture to close during the consolidation process. The resultant blank may be heated and drawn into a filament, or it may be sliced into optical windows, lenses or the like.

16 Claims, 8 Drawing Figures

METHOD OF MAKING OPTICAL DEVICES

CROSS-REFERENCE TO RELATED APPLICATION

This is a continuation of application Ser. No. 922,559, filed July 7, 1978, which is a continuation-in-part application of U.S. patent application Ser. No. 808,862 filed June 22, 1977, both abandoned.

BACKGROUND OF THE INVENTION

This invention relates to a method of making glass articles by the flame hydrolysis technique and, more particularly, to an improved method of making glass optical waveguide filaments.

It has been known for some time that light can be propagated along a transparent filamentary structure having a refractive index that is greater than that of its surroundings, and clad filaments have heretofore been employed to transmit light over relatively short distances. The numerical aperture (NA) of such a filament which is a measure of the light gathering ability thereof, can be approximated by:

$$NA = \sqrt{2n^2\Delta} \tag{1}$$

where n is the average of the core and cladding refractive indices, which are designated $n_1$ and $n_2$, respectively, and $\Delta$ is the refractive index difference between the core and cladding and is given by the equation, $\Delta = (n_1^2 - n_2^2)/2n_1^2$. In conventional optical filaments, $\Delta$ is made quite large so that the NA is large, and therefore, the filament is capable of gathering a relatively large amount of light emitted by a source.

Optical waveguides are low loss filaments which have been recently developed as the transmission medium for high capacity optical communication systems. It would be advantageous for optical waveguides to possess high values of NA for the purpose of accepting a large amount of the light radiated from a source connected thereto. Furthermore, optical waveguides are often grouped into cables or bundles to provide redundancy in case of fiber breakage and to transmit a greater amount of the light generated by a source. Attenuation $\gamma$ due to random fiber bends, which can be caused by the cabling process, is given by the equation:

$$\gamma = \frac{c}{\Delta}\left(\frac{a^2}{\Delta}\right)^p \tag{2}$$

where c and p are parameters related to the geometry of the random bends and the index gradient and a is the core radius. Examination of equation 2 shows that the distortion loss $\gamma$ can be reduced inter alia by increasing $\Delta$, a factor which will also increase the NA as indicated by equation 1.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in filamentary form. Various methods employing the flame hydrolysis technique for forming glass optical waveguide filaments are taught in U.S. Pat. Nos. Re 28,029, 3,711,262; 3,737,293; 3,823,995 and 3,826,560, the latter two patents being directed to the formation of gradient index waveguides. In accordance with one embodiment of the flame hydrolysis process a plurality of constituents in vapor form are entrained in a gaseous medium in predetermined amounts and thereafter are oxidized in a flame to form soot having a predetermined composition. The soot is applied to the surface of a rotating cylindrical mandrel or starting member. After a first layer of soot is deposited to form the core glass, the composition of the soot is changed to form the cladding glass. Heretofore, the soot has been either sintered as deposited, or it has been sintered in a subsequent operation. After the mandrel is removed, the resulting cylindrical hollow draw blank is heated to a temperature at which the material has a low enough viscosity for drawing and is drawn to reduce the diameter thereof until the inner walls of the hollow member collapse. Continued drawing further reduces the diameter until an optical waveguide filament having the desired dimensions is formed. The rate at which fibers can be drawn from the blank is a major factor in determining cost. Draw rate is in turn limited to that rate at which the hole or aperture in the center of the blank can be reliably closed. The need to acid wash the aperture forming walls in flame hydrolysis-produced blanks also increase the cost of producing optical waveguides.

The value $\Delta$ has been maintained relatively small in optical waveguides for a number of reasons. The cladding of low loss optical waveguides has usually been formed of a high purity glass such as silica, whereas the core has been formed of the same high purity glass to which a sufficient amount of dopant material has been added to increase the refractive index of the core to a value greater than that of the cladding. Optical waveguides initially formed by the flame hydrolysis process employed multivalent metal oxides such as titanium oxide, tantalum oxide and the like as the dopant material. An inherent problem of such waveguides was the limitation of dopant material to no more than about 15 wt.%. Although fused silica has excellent light transmission qualities in that absorption and intrinsic scattering of light thereby is exceptionally low, the addition of an excessive amount of the aforementioned multivalent metal oxide dopant material to increase the refractive index would cause absorption of light energy and intrinsic scattering of light to increase to undesirable levels.

Other oxides such as $GeO_2$ and $P_2O_5$, which have more recently been employed, also have excellent light transmission properties. As indicated in the publications: MacChesney et al. "A New Technique for the Preparation of Low-Loss and Graded-Index Optical Fibers", Proceedings of the IEEE, September, 1974, pp. 1280–1281 and Payne et al. "New Silica-Based Low-Loss Optical Fibre", Electronics Letters, Vol. 10, No. 15, July 25, 1974, pp. 289–290, the refractive indices of these oxides are sufficiently greater than that of $SiO_2$ so that they can be employed as a dopant to increase the refractive index of $SiO_2$. However, the numerical apertures of such optical waveguides have been relatively low since only a limited amount of such $GeO_2$ or $P_2O_5$ could be incorporated into the core thereof relative to the amount of such dopant in the cladding due to a mismatch of core-cladding characteristics such as thermal coefficient of expansion and softening point temperature.

Consider, for example, an attempt to fabricate a $GeO_2$ doped-$SiO_2$ optical waveguide by a prior art flame hydrolysis process whereby the mandrel aperture remains in the consolidated glass draw blank. Assume that the optical waveguide should have a numerical aperture of 0.24 based upon such considerations as the type of light sources to be employed and the types of bends to which the waveguide will be subjected. Knowing the cladding material to be employed, the cladding refractive index $n_2$ is known. For example, if the cladding material is $SiO_2$ doped with $B_2O_3$, $n_2$ is taken to be about 1.458, the refractive index of silica. Using the well known relationship $NA = (n_1^2 - n_2^2)^{\frac{1}{2}}$ the refractive index $n_1$ of the core is determined to be 1.477. It can be determined that the core glass should consist of about 23 wt.% $GeO_2$ to provide a binary $GeO_2$-$SiO_2$ glass having a refractive index of 1.477. The expansion coefficient of such a core glass is about $15 \times 10^{-7}$ per degree C. A pure $SiO_2$ cladding should not be employed with a core containing 23 wt.% $GeO_2$ since the expansion mismatch between the core and cladding would render it difficult to consolidate the soot preform without it breaking. Thus, a borosilicate cladding having a roughly matching thermal expansion coefficient is selected. It can be determined that a cladding glass of 12 wt.% $B_2O_3$ and 88 wt.% $SiO_2$ has an expansion coefficient (25°-700° C.) of about $12 \times 10^{-7}$ per degree C., the $3 \times 10^{-7}$ per degree C. difference in expansion coefficients being acceptable. For this combination of core and cladding glasses the softening point temperatures for the core and cladding are about 1630° C. and 1410° C., respectively. This mismatch of 220° C. in the softening point temperatures of the core and cladding glasses creates problems in the filament drawing process. Since the core glass has a much higher softening point temperature than the cladding glass, the hole in the draw blank is difficult to close during the filament drawing process, and the core diameter to outside diameter ratio tends to vary in the resultant filament. To prevent this problem the core should have a softening point temperature that is close to or somewhat lower than that of the cladding. A well known technique for lowering the softening point temperature of the core involves the addition of $B_2O_3$ to the core glass. Addition of $B_2O_3$ however, slightly decreases the refractive index of the core glass and increases the thermal expansion coefficient. To match this increased thermal expansion coefficient of the core glass, more $B_2O_3$ must be added to the cladding glass, thereby bringing back the viscosity mismatch problem. Thus, the amount of $GeO_2$ in the core has had to be limited to a value that would permit consolidation of the soot preform without excessive breakage, and therefore, the higher desired value of NA could not routinely be achieved.

SUMMARY OF THE INVENTION

It is an object of this invention to provide an economical method of forming an optical waveguide filament, which method also overcomes the heretofore noted disadvantages.

Another object of this invention is to provide a method of making an optical waveguide having a high numerical aperture.

A further object is to provide a method of making optical waveguide blanks having a reduced tendency to break due to the expansion mismatch of the core and cladding materials thereof.

Still another object is to form a solid glass article by the flame hydrolysis process.

These and additional objects, features and advantages of the present invention will become apparent to those skilled in the art from the following detailed description and the attached drawings on which, by way of example, only the preferred embodiments of this invention are illustrated.

This invention relates to an improved method of forming glass articles by the flame hydrolysis process. Briefly, this method comprises applying a first coating of glass soot to the outside peripheral surface of a cylindrical mandrel. A second coating of glass soot of higher refractive index than the first coating is applied over the outside peripheral surface of the first coating. The mandrel is removed to form a soot preform having an aperture therein. The resultant hollow preform is subjected to an elevated temperature for a period of time sufficient to permit the soot coating to consolidate and to permit the aperture to close. The compositions of the first and second coatings are chosen such that the ratio of the viscosities $V_1$ and $V_2$ of the first and second coatings, respectively, at the consolidation temperature, are such that the ratio $V_1/V_2$ is less than $\frac{1}{2}$ but is large enough to prevent the first coating from separating from the second coating. The resultant structure is then formed into a desired glass article. To form an optical waveguide, the consolidated preform is then either maintained at or heated to a temperature at which the materials have a low enough viscosity for drawing and is drawn to reduce the diameter thereof to form a glass optical filament which possesses the characteristic of the desired optical waveguide.

Detailed Description of the Invention

It is to be noted that the drawings are illustrative and symbolic of the invention, and there is no intention to indicate scale or relative proportions of the elements shown therein. Further, it is to be noted that the present invention expressly contemplates both single mode and multimode waveguides regardless of any specific description, drawing, or example set out herein. The present invention also contemplates optical waveguides having cores with either a constant or gradient index of refraction. In the case of gradient index optical waveguides the cladding may be the outer portion of the core, or it may be a layer whose refractive index is lower than that of the adjacent core material by such an amount that there is an abrupt change in refractive index at the core-cladding interface.

Figure 1:
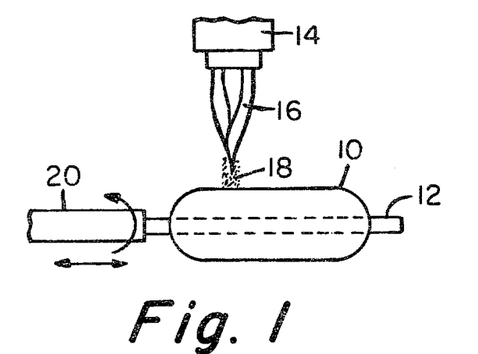
FIGS. 1 and 2 illustrate the application of first and second coatings of glass soot to a mandrel.
Figure 2:
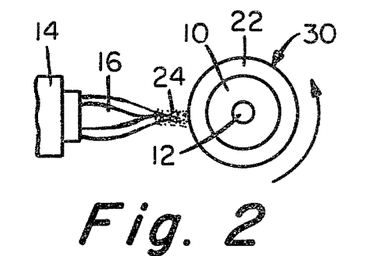

Optical waveguide soot preforms are conventionally prepared in accordance with the methods illustrated in FIGS. 1 and 2. A coating 10 of glass soot is applied to cylindrical mandrel 12 by means of flame hydrolysis burner 14. Fuel gas and oxygen or air are supplied to burner 14 from a source (not shown). This mixture is burned to produce flame 16 which is emitted from the burner. A gas-vapor mixture is oxidized within flame 16 to form a glass soot that leaves the flame in a stream 18, which is directed toward mandrel 12. The flame hydrolysis method of forming soot coatings on cylindrical mandrels is described in greater detail in the aforementioned U.S. Pat. Nos. Re. 28,029 and 3,823,995. Mandrel 12 is supported by means of handle 20 and is rotated and translated as indicated by arrows adjacent thereto in FIG. 1 for uniform deposition of soot. This method can be employed to produce either step index or gradient index waveguides.

A second coating of soot is applied over the outside peripheral surface of first coating 10 as shown in FIG. 2. In accordance with well-known practice the refractive index of coating 22 is made lower than that of coating 10 by changing the composition of the soot 24 being produced in flame 16. This can be accomplished by changing the concentration or type of dopant material being introduced into the flame, or by omitting the dopant material. Mandrel 12 is again rotated and translated to provide a uniform deposition of coating 22, the composite structure including first coating 10 and second coating 22 constituting an optical waveguide soot preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

Many suitable materials have been used as a dopant alone or in combination with each other to increase the refractive index of fused silica. These include, but are not limited to, titanium oxide, tantalum oxide, aluminum oxide, lanthanum oxide, phosphorus oxide and germanium oxide. A core of germania doped fused silica is advantageously provided with a cladding layer of fused silica doped with boron oxide which provides a refractive index slightly lower than that of pure fused silica and also gives the cladding layer a somewhat higher thermal coefficient of expansion than pure fused silica, thereby providing a better match between the coefficients of expansion of the core and cladding materials.

Heretofore, the soot preform has been inserted into a furnace wherein the soot is subjected to a temperature within the consolidation temperature range thereof for a time sufficient to cause the particles of soot to fuse and consolidate to form a dense glass body free from particle boundaries. However, no attempt was made to close the preform aperture during the consolidation process, and therefore, the consolidation temperature was maintained below the softening point temperature of the glass to avoid deformation and elongation of the resultant draw blank. When the preform is immediately and completely introduced into the furnace, uniform consolidation takes place throughout the entire body. However, when this procedure is followed, there is a tendency for gas inclusions, commonly known as bubbles or seeds, to occur in excessive amounts. Accordingly, it is usually preferable to progressively introduce the preform into the heat zone whereby it is progressively consolidated in the manner taught in U.S. Pat. No. 3,806,570. The consolidation process has been carried out in various atmospheres such as He, He and $O_2$, air, vacuum and the like.

Heretofore, the mandrel has been removed either before or after the consolidation process. In those instances wherein the mandrel has been removed after the consolidation process, such methods as etching, reaming, core drilling or the like have been employed. Since the mandrel is ultimately removed, the material thereof need only be such as to have a composition and coefficient of expansion compatible with the waveguide cladding and core materials. Suitable materials are glass, ceramic, graphite and the like. Regardless of when the mandrel was removed, prior methods resulted in a hollow, cylindrical, dense glass draw blank 34, such as that illustrated in FIG. 3, from which the optical waveguides were drawn. Blank 34 comprises first and second dense glass layers 36 and 38, respectively, the refractive index of layer 36 being greater than that of layer 38. The diameter of aperture 40 is typically about 0.4 cm.

Because of the dopants added to the core region of the blank to increase the refractive index thereof, the coefficient of expansion of that region is greater than that of the cladding region. Thus, when the blank cools after the consolidation process, the central region is put into a state of tension. The aperture in the center of the blank, which has remained after removal of the mandrel, presents a free surface in the region of high tensile force where breaks are readily initiated. The need to keep the coefficient of expansion of the core region down to a value nearer to that of the cladding region is one of the factors that has prevented the production of optical waveguides having a higher values of numerical aperture.

Prior to drawing the blank into a filament it has been necessary to subject the blank aperture to an acid wash followed by careful rinsing to avoid contamination which could render the resultant filament useless for the purposes for which it has been produced.

To form an optical waveguide from the hollow draw blank, it is heated to the drawing temperature thereof, preferably within a controlled environment. It may, however, be heated in air at this point in the process. After the structure reaches a temperature at which the materials have a low enough viscosity for drawing, it is drawn until the hole therein collapses and until the cross-sectional size thereof is reduced sufficiently to provide the desired diameter. The rate of drawing the filament has been limited by the necessity of closing the aperture of the draw blank during the drawing process.

Figures 3, 4, 5, 6:
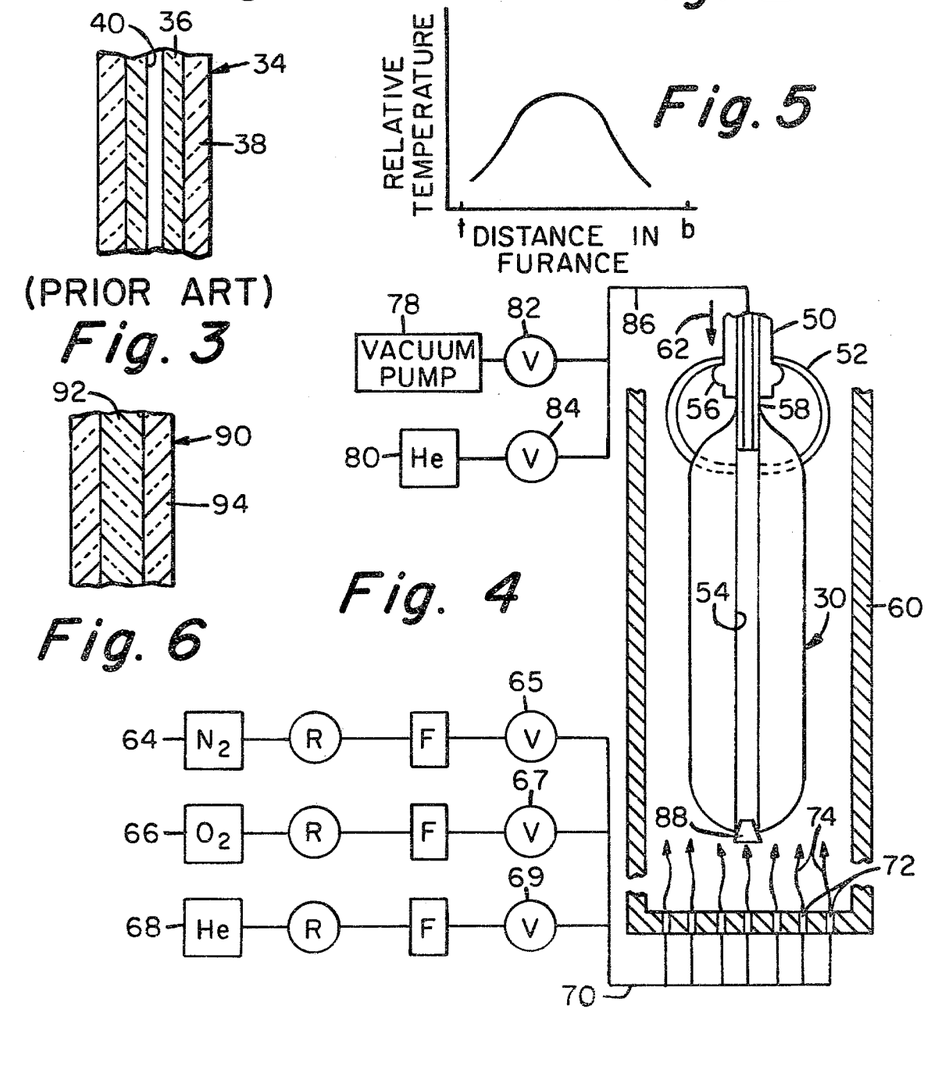
FIG. 3 is a cross-sectional view of a dense glass blank formed in accordance with prior art methods.
FIG. 4 is a schematic representation of a consolidation furnace and a consolidation atmosphere system.
FIG. 5 is a graph illustrating the temperature profile of a typical consolidation furnace.
FIG. 6 is a cross-sectional view of a dense glass blank formed in accordance with the method of the present invention.

The aforementioned disadvantages are overcome by consolidating glass soot preforms in accordance with the method of the present invention, which embodies a number of modifications to the conventional preform consolidation processes. Briefly, the mandrel is removed, and the resultant hollow soot preform is subjected to a temperature that is higher than that presently employed to cause soot consolidation only. As the preform is heated the soot consolidates first, and due to the predetermined relative viscosities of the core and cladding materials, further heating causes the aperture to close. The amount of time required to close the aperture is greatly reduced by reducing the pressure within the aperture during the consolidation process. The resultant draw blank 90, which is illustrated in FIG. 5, comprises a core 92 surrounded by cladding layer 94. Draw blank 90 has much less tendency to break upon cooling since there is no free surface in the high tensile force region of the core.

The mandrel can be removed from the soot preform by merely mechanically twisting and pulling it from the preform. Care must be taken to minimize damage done to the preform while removing the mandrel since such damage may result in the formation of seeds at the center of the resultant blank. However, since these seeds are visible, portions of the blank that contain seeds can be discarded. Preform 30 is then suspended from tubular support 50 as shown in FIG. 4. Two platinum wires, of which only wire 52 is shown, protrude through preform 30 on opposite sides of aperture 54 and are affixed to support 50 just above flange 56. Although the end of gas conducting tube 58 is shown protruding from tubular support 50 and into the adjacent end of preform 30, certain embodiments of the present invention do not require tube 58.

The vertical sidewalls of furnace 60 are broken to illustrate that the relative depth thereof is greater than that shown. The furnace length is usually about two or three times that of the preform. As shown in FIG. 5, wherein t and b refer to the top and bottom, respectively, of the furnace, the maximum temperature exists near the center of the furnace. Thus, a preform could be subjected to a maximum temperature of 1500° C. for example, in the center of the furnace and a temperature of 500° C. at the top or bottom thereof.

In this figure flow regulators are schematically represented by the letter "R" within a circle, flow meters by the letter "F" within a rectangle and valves by the letter "V" within a circle. Sources 64, 66 and 68 of nitrogen, oxygen and helium, respectively, are illustrative of the gases which may be employed as the consolidation atmosphere. These gases may be connected by their respective valves and by a line 70 to orifices 72 in the bottom of furnace 60. Undulated arrows 74 represent the flow of the consolidation atmosphere gas from the orifices.

In certain embodiments to be hereinafter described it is necessary to create a reduced pressure within aperture 54 or to trap helium within that aperture. It may therefore be necessary to connect a vacuum pump 78 or a source 80 of helium to tube 58. This connection is illustrated as being made through valves 82 and 84 and line 86. In order to create a low pressure within preform 30, a plug 88 of the same glass composition as the core glass or one having similar expansion characteristics is inserted into the end of aperture 54. Alternatively, that end of the preform may be subjected to a local heat source such as a flame to close the end of aperture 54.

The preform is consolidated by gradually inserting it into furnace 60 as indicated by arrow 62. It is preferred that the preform be subjected to gradient consolidation, a technique taught in the aforementioned U.S. Pat. No. 3,806,570, whereby the bottom tip of the preform begins to consolidate first, the consolidation continuing up the preform until it reaches that end thereof adjacent to tubular support 50.

Consolidation may take place in various atmospheres described in the prior art. In accordance with the teachings of U.S. Pat. No. 3,933,454 it may comprise an atmosphere rich in helium which can readily pass through the interstices of the porous soot preform to purge residual gas therefrom. The phrase "helium-rich atmosphere" as used herein means one that contains at least 97% helium. Other gases such as oxygen, nitrogen, argon, neon and mixtures thereof may be employed to flush gases from the preform during consolidation. A halogen, preferably chlorine, is sometimes employed to dry the preform to an extent greater than that which can be achieved by the use of helium alone, combinations of helium and chlorine compounds being disclosed in the aforementioned U.S. Pat. No. 3,933,454.

The surface tension at the inner surface of a draw blank during a conventional high temperature soot consolidation process tends to reduce the surface area of the aperture forming walls, but the physical characteristics of presently employed materials are such that there is very little reduction in aperture diameter when the preform is subjected to presently employed consolidation temperatures for reasonable periods of time, i.e. less than a few hours. However, in a situation wherein the core and cladding viscosities are equal at the consolidation temperature, the preform aperture can be closed during the consolidation process by subjecting the preform to a temperature slightly above the softening point temperatures of the core and cladding glasses for a period of time between 4 and 6 hours. In addition to requiring an excessively long time, such a process results in excessive sagging or blank elongation, about 50% elongation being common. These disadvantages render this method unsuitable for use in commercial processes.

It has been found that the closing of the blank aperture during consolidation is greatly facilitated by reducing the pressure within the blank aperture and/or controlling the compositions of the core and cladding materials so that the viscosity of the core is lower than that of the cladding by an amount within a given range at the consolidation temperature. Moreover, the consolidation process should be performed at a temperature slightly above conventional consolidation temperatures. The temperature to which a soot preform should be heated to cause soot consolidation and aperture closing depends upon the compositions of the core and cladding materials. Therefore, the consolidation and aperture closing temperature will be set forth in terms of glass viscosity, a paratmeter that is applicable to all glass compositions. In those situations wherein the viscosity of the core glass is different from that of the cladding glass, reference to the viscosity of the preform in connection with specifying consolidation temperature refers to the higher viscosity of the core and cladding glasses.

Since it is desirable to close the aperture in the shortest possible time, the consolidation temperature is preferably high enough to cause the preform viscosity to be between about $10^7$ and $10^{10}$ poise. If the soot preform is subjected to such a temperature at the same time that the pressure within the aperture is reduced to 20 in. Hg, the aperture can be closed within about 2 minutes to 36 hours.

The aperture closing process is facilitated by selecting the core and cladding materials such that the ratio $V_1/V_2$ of the viscosity of the core to that of the cladding is ½ or less. As indicated hereinabove, the aperture cannot be closed within a reasonable period of time when the viscosity of the core is equal to or greater than that of the cladding. The aperture has been satisfactorily closed when the ratio $V_1/V_2$ has been about 1/500, and it is expected that the method of the present invention will be operative at ratios of $V_1/V_2$ as low as about 1/2000. Under certain conditions, especially when the ratio of $V_1/V_2$ becomes too low, the core-forming glass soot consolidates too soon before the cladding-forming soot begins to consolidate. Thus, the core glass begins to consolidate and flow while the geometry of the cladding glass remains relatively fixed. Under such circumstances, especially if the viscosity changes abruptly at the core-cladding interface, physical separation can occur at that interface as the core glass consolidates first and pulls away from the unconsolidated cladding glass. This undesirable set of conditions was found to exist for a core glass composition of approximately 60 wt.% $SiO_2$, 25 wt.% $GeO_2$ and 15 wt.% $B_2O_3$ and a cladding glass composition of approximately 98 wt.% $SiO_2$ and 2 wt.% $B_2O_3$. The viscosity ratio $V_1/V_2$ is about 1/3000 for this set of conditions. Physical separation at the core-clad interface can occur at viscosity ratios $V_1/V_2$ as high as about 1/50 if one or more of the following conditions are also present: much lower pressure within the aperture than the pressure surrounding the outside of the preform, a very slow rate of inserting the preform into the consolidation furnace hot zone, a low temperature gradient within the consolidation furnace, a low soot density in the preform, or a steep or a step viscosity gradient between the preform core and cladding. A viscosity ratio $V_1/V_2$ between ½ and 1/2000 provides acceptable results in the absence of externally applied pressure, a ratio between 1/5 and 1/1000 being preferred. This latter range of viscosity ratios provides relatively undistorted consolidated draw blanks within a reasonable period of time, i.e., less than about two hours.

Figure 7:
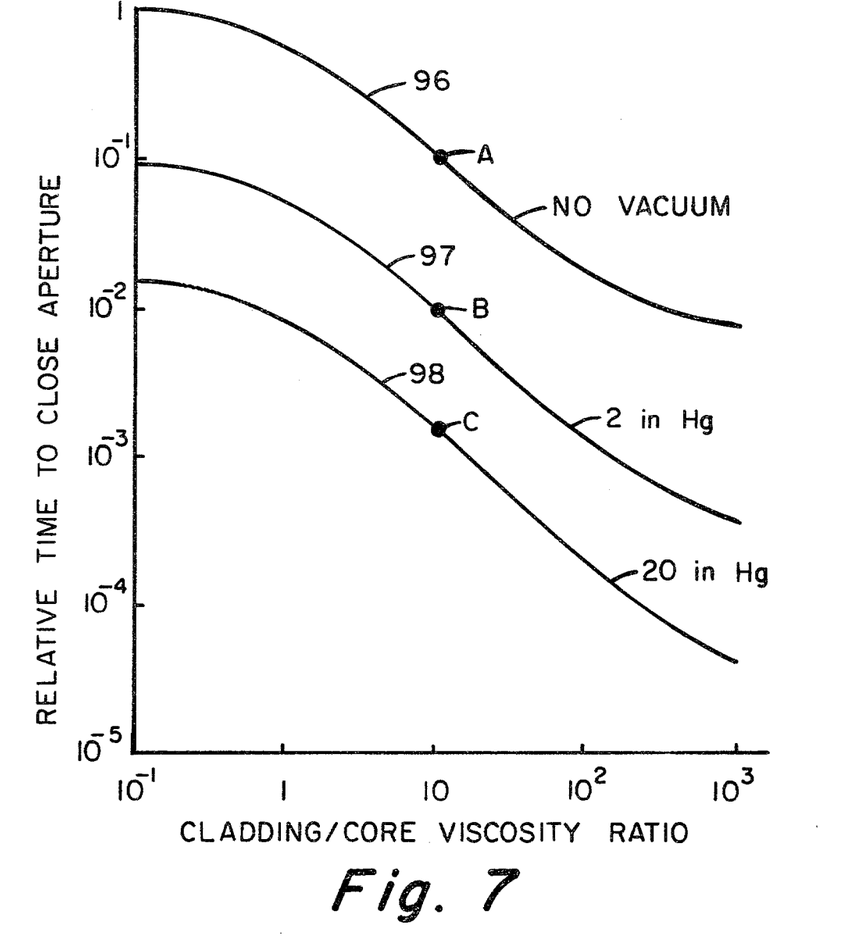
FIG. 7 is a graph wherein relative aperture closing time is plotted as a function of the core/cladding viscosity ratio for various degrees of vacuum within the aperture.

If the gas pressure in the preform aperture is made less than the pressure surrounding the outside of the preform, the preform aperture tends to close faster. Referring to FIG. 4, plug 88 is employed, and valve 82 is opened, whereas valve 84 remains closed. Thus, vacuum pump 78 creates a low pressure within aperture 54 with respect to the atmosphere within furnace 60. The improvement in aperture closing time is illustrated in the graph of FIG. 7 wherein the relative time to close the aperture is plotted as a function of cladding/core viscosity ratio for a core diameter-outside diameter ratio of 0.707. Curve 96 relates to consolidation without a reduced pressure in aperture 54, curve 97 relates to a consolidation process wherein a reduced pressure of 2 in Hg is applied to aperture 54 and curve 98 pertains to a consolidation process wherein a reduced pressure of 20 in Hg is applied to aperture 54.

The amount of reduction in the duration of the consolidation process due to the application of a reduced pressure to the preform aperture is determined as follows. Assuming that the ratio of the core diameter to the outside diameter of a soot preform is 0.707 and that the ratio of the cladding viscosity to that of the core is 10:1, the process is represented by point A on curve 96 if no vacuum is employed. If a similar consolidation process were employed with the exception that a reduced pressure of 2 in. Hg. were applied to aperture 54, the process would now be represented by point B on curve 97. The relative difference in time between points A and B is about one order of magnitude. Assuming that the process without the use of a vacuum required 5 hours, it can be seen that the use of a reduced pressure of 2 in. Hg. would reduce the time required to close the preform aperture to only about 0.5 hour. As indicated by the relative time difference between points B and C, a further reduction in time of almost an additional order of magnitude would be achieved if the pressure were reduced to b 20 in. Hg. Thus, everything else being equal, only slightly more than 0.05 hour would be required to consolidate the preform. When the pressure within the preform aperture becomes too low, two opposing walls of the aperture may flatten against each other resulting in a distortion of the core. The aperture closes uniformly, i.e., without wall collapse, when closing occurs gradually, i.e., when more than 10 minutes are required to close the aperture. For best results, aperture closing should not require more than about 120 minutes.

The calculations presented in FIG. 7 are based on the assumption that the blank is initially non-porous (incompressible) and that the hole tends to close as a result of applied pressure and/or the surface tension acting on the center hole. There is, however, another force acting which tends to collapse the center hole, viz. the contraction of th cladding soot during sintering. If the core soot is sufficiently fluid, it will sinter to clear glass before the cladding has densified significantly; the subsequent contraction of the cladding (at higher temperature and/or longer times) compresses the core with a force of 2-20 atmospheres and collapses the center hole. This method takes advantage of the enormous capillary force which cuases contraction of the cladding, rather than the tiny surface tension acting on the center holes's own surface.

Other factors which affect the relative time to close the aperture include the ratio of the starting aperture to the overall preform diameter (the smaller this ratio becomes the more readily the aperture closes); the ratio of the preform core diameter to the overall diameter (generally the larger this ratio is the more readily the aperture closes); the soot density (the higher the soot density the more readily the aperture closes); and the higher the consolidation temperature gradient becomes the more readily the aperture closes.

It has been previously mentioned that it is advantageous to employ a helium-rich atmosphere during the initial portion of the consolidation process during which the soot particles consolidate to form a dense glass free from particle boundaries. If the initial portion of the consolidation process is performed without the connection of vacuum pump 78 to aperture 54, that aperture will be filled with helium which can be trapped therein by plug 88 and similar aperture closing means affixed to the opposite end of the aperture. During the remainder of the consolidation process, wherein the aperture closes, the helium can diffuse out through the walls of the dense glass blank. After the soot has been consolidated, the process of out-diffusion can be enhanced by changing the furnace atmosphere to a helium-free atmosphere. For example, valve 69 can be closed, valve 65 can be opened and the flow of oxygen from source 66 can be increased to provide furnace 60 with an atmosphere consisting of nitrogen and oxygen. Alternatively, a source of air can be connected to line 70 during that portion of the process after the soot particles have consolidated but before the hole has closed.

If vacuum pump 78 has been employed to create a low pressure within aperture 54 during the initial portion of the consolidation process, aperture 54 can be filled with helium by closing valve 82 and opening valve 84 to bleed helium from source 80 into the preform aperture. Evacuation of aperture 54 and refilling with helium may be repeated several times to increase the purity of helium trapped therein. Thereafter, the furance atmosphere can be changed to a helium-free atmosphere as indicated above to enhance diffusion of helium from the aperture. After helium has been supplied to aperture 54 by bleeding the same into the aperture after evacuation thereof, it may be desirable to seal that end of aperture 54 adjacent to tube 58. This can be accomplished by at least partially withdrawing the preform from the furnace and locally applying heat to the top portion of the preform by means such as a flame to hasten the closing of the aperture in the region of localized heating.

It is expedient to consolidate the glass soot into a dence glass and to close aperture 54 in one insertion of the preform into the consolidaton furnace. The time required to completely consolidate a preform and close the aperture therein can be empirically determined by periodically withdrawing the preform from the furnace and observing the aperture size. The presentinvention also encompasses those processes wherein two or more insertions of the preform into the furnace are made prior to complete closure of the aperture. However, the partially consolidated preform cannot be permitted to cool to room temperature prior to closure of aperture 54 because of the risk of breaks initiating at the surface of that aperture.

After a preform has bween consolidated and the aperture therein closed, the resultant draw blank can be cooled to room temperature prior to being drawn into a fiber. Draw blanks are usually cleaned, flame worked to form a flange on one end thereof and provided with a tapered starting tip on the other end thereof. Blanks are then recleaned using a degreasing solvent, subjected to hydrofluoric acid wash and water rinse just prior to inserting into the fiber draw furnace. Drawing includes control of draw furnace atmosphere, e.g., 50% $N_2$ and 50% $O_2$, and a slow feed of the blank, e.g., about 4.5 cm/hr, into the hot furnace which may be between 1600° C. and 1900° C. Filament drawing rates are about 0.5 m/sec.

Figure 8:
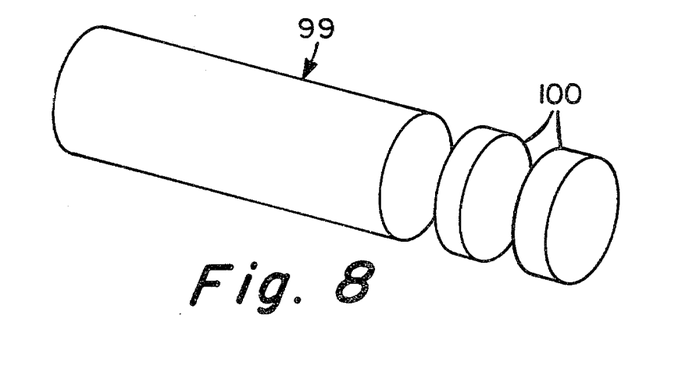
FIG. 8 is an oblique view of a consolidated glass blank having discs sliced therefrom.

Although the method of this invention is most advantageously employed in conjunction with the formation of optical waveguide filaments, it is also useful for forming other optical devices such as lenses, low loss optical windows, and the like. Referring to FIG. 8, consolidated blank 99 is sliced into a plurality of discs 100. If the blank comprises pure fused silica, the discs may be utilized as optical windows. If the blank is formed in accordance with the teachings of the aforementioned U.S. Pat. Nos. 3,823,995 and 3,826,560, whereby the refractive index gradually decreases from the axis to the periphery thereof, the discs will function as lenses.

Since the method of the present invention results in the closing of the aperture during the consolidation process, the free surface in the center of the blank, which has heretofore caused breakage because of the tensile force therein, has been eliminated. Thus, core and cladding materials having relatively large differences in expansion characteristics may be employed in the manufacture of optical waveguides, thereby resulting in optical waveguides having higher numerical apertures. Moreover, blank cleaning has been simplified since aperture contamination has been eliminated.

The invention will be further described with reference to specific embodiments thereof which are set forth in the following examples. In these examples, which pertain to the manufacture of optical waveguides, the inside diameter of the furnace muffle is 3¼ inches, and the length thereof is 50 inches.

EXAMPLE 1

A tubular mandrel of fused quartz, approximately 0.6 cm in diameter and about 200 cm long is secured to a handle. Liquid $SiCl_4$, liquid $GeCl_4$ and $BCl_3$ are maintained at 32° C., 42° C. and 20° C. in first, second and third containers, respectively. Dry oxygen is bubbled through the first container at 2 SLPM and through the second container at 0.8 SLPM. $BCl_3$ is metered out of the third container at about 100 sccm. The resultant vapors entrained within the oxygen are combined and passed through a gas-oxygen flame where the vapor is oxidized and formed into a steady stream of particles having a composition of 70 wt.% $SiO_2$, 25 wt.% $GeO_2$ and 5 wt.% $B_2O_3$, and having a refractive index of about 1.476. The stream is directed to the starting member and a soot coating comprising particles of this composition is applied up to about 3 cm in diameter. A second coating of soot comprising about 98 wt.% $SiO_2$ and and 2 wt.% $B_2O_3$ is then applied over the first soot coating by terminating the flow of oxygen to the liquid $GeCl_4$ and reducing the flow of $BCl_3$ from a third container to about 40 sccm while maintaining the flow of oxygen through the first container at about 2 SLPM. The refractive index of this second coating is about 1.457. This cladding soot is applied until an outside diameter of aproximately 6 cm is attained. The starting member is pulled from the soot preform, thereby leaving a hollow preform having a diameter of 6 cm and a length of 30 cm and a 0.6 cm aperture therethrough. At 1300° C. the viscosity of the first soot coating is about $10^{8.6}$ poise whereas that of the second applied coating is about $10^{10.6}$ poise.

One end of the preform is attached to a support such as member 50 of FIG. 4, platinum wire being employed to attach the upper end of the preform to that support. It is noted that the support differs from that of FIG. 4 in that it is not hollow and does not include a member which protrudes into the preform aperture. Valve 65 of FIG. 4 remains closed while valves 67 and 69 are opened to permit oxygen and helium to flow therethrough. The flow regulators are adjusted to permit a helium flow of 20 SLPM and an oxygen flow of 20 sccm. The preform is lowered into the furnace at about 1 cm per minute, the maximum furnace temperature being about 1450° C. After the entire length of the preform has passed through the hot zone of the furnace, a process requiring about 70 minutes, the consolidated draw blank is withdrawn at a rate of about 1.0 cm per minute. The resultant structure is drawn at a temperature of about 1800° C. to decrease the outside diameter thereof, drawing being continued until the final waveguide diameter of about 125 μm is achieved, the core diameter being about 62 μm. Since the draw blank does not contain an aperture which must be closed during drawing, the filament can be drawn at rates exceeding 1.0 m/sec. The numerical aperture of the resultant optical waveguide filament is about 0.24.

EXAMPLE 2

A soot preform is formed in accordance with Example 1. After the mandrel is removed, the preform is attached to a support of the type illustrated in FIG. 4, a tube 58 being inserted in the top end of the aperture. A low expansion borosilicate glass plug is inserted into the bottom end of the aperture. A vacuum pump which is connected to the preform aperture is adjusted to provide a partial vacuum of 1 in Hg within the preform aperture.

With oxygen and helium being supplied to the bottom of the furnace at the same rates described in Example 1 the preform is inserted into the top of the furnace at a rate of about 10 cm per minute, consolidation of the soot and closure of the preform aperture being accomplished in about 15 minutes.

EXAMPLE 3

A soot preform is formed in accordance with Example 1. After the mandrel is removed, the preform is attached to a support of the type illustrated in FIG. 4, a tube 58 being inserted into the top of the aperture. A low expansion borosilicate glass plug is inserted into the bottom end of the aperture. A vacuum system which is connected to the preform aperture is adjusted to provide a partial vacuum of 20 in. Hg within the preform aperture. Oxygen and helium are supplied to the bottom of the furnace at the same rates described in Example 1. The furnace temperature is 1580° C. at the center thereof, the temperature decreasing in the manner illustrated in FIG. 5 to about 500° C. near the top and bottom of the furnace. The preform is inserted into the furnace at a rate of 0.5 cm per minute. After the preform has entered the furnace but prior to its reaching the hot zone in the center thereof, the preform is subjected to a hold cycle whereby its progress into the furnace is temporarily halted. The valve to the vacuum system is closed and that to the helium is opened whereby the preform aperture is filled with helium. The initial cycle is repeated whereby the aperture is evacuated and is thereafter filled with helium. Insertion of the preform into the furnace is then resumed at a rate of 0.5 cm per minute. The preform consolidates and the aperture closes as the preform passes through the hot zone. After the entire preform has passed through the hot zone, its downward progress ceases. The flow of oxygen is increased to 2 SLPM, the helium is turned off, and nitrogen is caused to flow through the furnace at a rate of 10 SLPM. The consolidated draw blank is then withdrawn from the furnace and drawn into an optical waveguide in accordance with Example 1.

EXAMPLE 4

A tubular mandrel of fused quartz approximately 0.6 cm in diameter and about 200 cm long is secured to a handle. Liquid $SiCl_4$ maintained at a temperature of 20° C. is provided in a first container and liquid $TiCl_4$ maintained at a temperature of 88° C. is provided in a second container. Dry oxygen is bubbled through both liquids so that the vapors of each are picked up by the oxygen. Oxygen is initially bubbled through the $SiCl_4$ at a rate of 5,000 sccm and through the liquid $TiCl_4$ at the rate of 118 sccm. Under these conditions, the vapors entrained within the oxygen comprise 2.3 mole percent $TiCl_4$ and 97.7 mole percent $SiCl_4$. This ratio of vapors, when hydrolyzed within the flame of a flame hydrolysis burner provides a soot composition of 3 weight percent $TiO_2$ and 97 weight percent $SiO_2$ having a refractive index of 1.4662 for light having a wavelength of 5893 Å. This soot is deposited as a layer having a thickness of about 0.0175 inch onto the rotating and translating mandrel. After the first soot layer is applied, the flow of dry oxygen through the $TiCl_4$ liquid is decreased to approximately 117.7 sccm to yield a second soot layer of decreased $TiO_2$ content. After each layer is applied, the flow of dry oxygen through the $TiCl_4$ liquid is incrementally decreased to permit the application of a plurality of layers each having a progressively decreasing $TiO_2$ content and consequently a progressively decreasing refractive index until the outer layer is pure $SiO_2$. The mandrel is removed from the soot preform which is thereafter consolidated in accordance with the method of Example 2 whereby an elongated solid glass body is formed. After cooling, the resultant cylindrically shaped glass blank is sliced by a diamond saw into a plurality of discs which function as optical lenses.

EXAMPLES 5–16

Table I lists the dopant concentrations, viscosity ratios for the stated consolidation temperatures, type of core index profile, consolidation furnace feed rates, pressure differences between the aperture and outside the preform during consolidation and the resulting preform conditions of whether the aperture closed or separation occurred between the preform core and cladding. The preform dimensions for Examples 5–16 where similar to those of the preform of Example 1. The balance of the core and cladding compositions is $SiO_2$.

TABLE I

| Example | Core Wt.% $B_2O_3$ | Wt. %$GeO_2$ | Clad Wt.% $B_2O_3$ | $V_1/V_2$ | Core Index Profile | Feed Rate (mm/min) | Cons. Temp. (°C.) | Vacuum (in. Hg) | Results |
|---|---|---|---|---|---|---|---|---|---|
| 5  | 5  | 25 | 2 | 1/15  | Graded | 3   | 1400 | 20 | Hole closed |
| 6  | 2  | 25 | 2 | 1/15  | "      | 3   | 1400 | 20 | Hole closed |
| 7  | 2  | 12 | 2 | 1/8   | "      | 5   | 1450 | 20 | Hole closed |
| 8  | 10 | 12 | 2 | 1/500 | Step   | 5   | 1430 | 20 | Separation |
| 9  | 2  | 12 | 2 | 1/8   | Graded | 5   | 1430 | 2  | Hole closed |
| 10 | 10 | 12 | 2 | 1/500 | "      | 5   | 1430 | 0  | Separation |
| 11 | 2  | 12 | 2 | 1/8   | "      | 2   | 1430 | 2  | Hole closed |
| 12 | 10 | 12 | 2 | 1/500 | "      | 100 | 1430 | 0  | Hole closed |
| 13 | 10 | 12 | 2 | 1/500 | "      | 100 | 1400 | 20 | Separation |
| 14 | 10 | 25 | 5 | 1/50  | "      | 10  | 1325 | 0  | Hole closed |
| 15 | 10 | 25 | 5 | 1/50  | "      | 10  | 1275 | 0  | Hole closed |
| 16 | 6  | 25 | 5 | 1/10  | "      | 2   | 1275 | 0  | Hole closed |

I claim:
1. A method of forming a high purity glass article comprising the steps of
providing a substantially cylindrical mandrel, applying a first coating of glass soot to the outside peripheral surface of said mandrel, applying a second coating of glass soot over the outside peripheral surface of said first coating, the glass soot of said second coating having a refractive index less than that of the glass soot of the first coating, removing said mandrel to form a soot preform having an aperture therein, heating said preform to a sufficiently high temperature for a sufficient period of time to permit said first and second soot coatings to simultaneously consolidate and permit said aperture to close, the viscosities $V_1$ and $V_2$ of said first and second coatings of glass soot, respectively, at said consolidation temperature being such that the ratio $V_1/V_2$ is less than ½ but is large enough to prevent the first coating from separating from the second coating, and forming the structure so formed into a desired glass article.

2. The method of claim 1 wherein the step of heating is characterized in that said preform is suspended vertically by one end thereof and is gradually inserted into a furnace having a temperature such that gradient consolidation of said preform occurs.

3. The method of claim 2 wherein the ratio $V_1/V_2$ is no smaller than 1/2000.

4. A method in accordance with claim 3 wherein the step of forming comprises heating the structure so formed to the drawing temperature of the materials thereof, and drawing the heated structure to reduce the cross sectional area thereof, thereby forming an optical waveguide.

5. A method in accordance with claim 4 wherein the ratio $V_1/V_2$ is between 1/5 and 1/1000.

6. A method of forming a clad optical waveguide comprising the steps of providing a substantially cylindrical mandrel, applying a first coating of glass soot to the outside peripheral surface of said mandrel, applying a second coating of glass soot over the outside peripheral surface of said first coating, the glass soot of the second coating having a refractive index less than that of the glass soot of the first coating, the viscosities $V_1$ and $V_2$ of said first and second coatings of glass soot, respectively, being such that the ratio $V_1/V_2$ is between ½ and 1/2000 at that temperature at which the glass soot of the second coating reaches a viscosity of $10^{10}$ poise, removing said mandrel to form a soot preform having an aperture therein, suspending said preform vertically from one end thereof, gradually inserting said preform into a furnace, the temperature and rate of insertion being such that gradient consolidation of said preform occurs while said aperture simultaneously closes, and heating the structure so formed to the drawing temperature of the materials thereof, and drawing the heated structure to reduce the cross-sectional area thereof, thereby forming an optical waveguide.

7. A method in accordance with claim 6 wherein the ratio $V_1/V_2$ is between ½ and 1/1000.

8. A method in accordance with claim 7 wherein the step of gradually inserting said preform into a furnace comprises heating said preform to a temperature at which the viscosity of said core glass is between $10^7$ and $10^{10}$ poise.

9. A method in accordance with claim 5 wherein the duration of the step of heating said preform is between 10 and 120 minutes.

10. A method in accordance with claim 9 wherein, prior to the time that said aperture closes, helium is bled into said aperture, the closing of said aperture being accompanied by the diffusion of helium from said aperture through said consolidated glass soot.

11. A method in accordance with claim 10 wherein said furnace is provided with a helium-rich atmosphere during the step of gradually inserting said preform, and is provided with a helium-free atmosphere after helium is bled into said aperture.

12. A method in accordance with claim 11 wherein the ratio of $V_1/V_2$ is between 1/5 and 1/1000.

13. A method in accordance with claim 9 wherein the step of heating is characterized in that the preform is gradually inserted into a furnace which heats said preform without the use of a flame.

14. A method in accordance with claim 8 wherein, during the step of gradually inserting said preform into a furnace, said furnace is provided with a helium-rich atmosphere, and after said soot has consolidated into a dense glass but prior to the time that the said aperture closes, said furnace is provided with a helium-free atmosphere.

15. A method in accordance with claim 6 wherein the duration of the step of heating said preform is between 10 and 120 minutes.

16. A method in accordance with claim 15 wherein the step of heating is characterized in that the preform is gradually inserted into a furnace which heats said preform without the use of a flame.

* * * * *